(12) United States Patent
Komiya et al.

(10) Patent No.: US 12,105,580 B2
(45) Date of Patent: Oct. 1, 2024

(54) TRANSMISSION SYSTEM

(71) Applicant: ROHM CO., LTD., Kyoto (JP)

(72) Inventors: Toshihide Komiya, Kyoto (JP); Kenya Nakamura, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/952,885

(22) Filed: Sep. 26, 2022

(65) Prior Publication Data

US 2023/0015354 A1    Jan. 19, 2023

Related U.S. Application Data

(63) Continuation of application No. PCT/JP2021/011459, filed on Mar. 19, 2021.

(30) Foreign Application Priority Data

Mar. 26, 2020 (JP) ................................ 2020-056346

(51) Int. Cl.
   *G06F 11/07*    (2006.01)
   *G06F 13/24*    (2006.01)

(52) U.S. Cl.
   CPC ...... *G06F 11/0784* (2013.01); *G06F 11/0745* (2013.01); *G06F 13/24* (2013.01)

(58) Field of Classification Search
   CPC ... G06F 11/0784; G06F 11/0745; G06F 13/24
   See application file for complete search history.

(56) References Cited

U.S. PATENT DOCUMENTS

| | | | |
|---|---|---|---|
| 7,707,338 B1 * | 4/2010 | Walch .................. | G06F 13/385 |
| | | | 710/48 |
| 2006/0184606 A1 * | 8/2006 | Lesartre ................ | G06F 11/006 |
| | | | 709/200 |

(Continued)

FOREIGN PATENT DOCUMENTS

| | | |
|---|---|---|
| JP | 2015041205 A | 3/2015 |
| WO | 2008099523 A1 | 8/2008 |

OTHER PUBLICATIONS

International Search Report for International Application No. PCT/JP2021/011459; Mailing Date, Jun. 1, 2021.

(Continued)

*Primary Examiner* — Jigar P Patel

(74) *Attorney, Agent, or Firm* — CANTOR COLBURN LLP

(57) ABSTRACT

Upon receiving an interrupt request via any one from among multiple first interrupt signal lines, a serializer identifies an error device which is one device from among the multiple devices that has transmitted the interrupt request and transmits the identification number of the error device to a deserializer. Furthermore, the serializer reads status information from the error device via a first interface and transmits the status information of the error device to the deserializer. The deserializer is structured to store the identification number of the error device and the status information in its internal register, and of transmitting an interrupt request to a controller via a second interrupt signal line. The deserializer transmits the identification number of the error device and the status information to the controller in response to a read command received from the controller.

8 Claims, 11 Drawing Sheets

(56) References Cited

U.S. PATENT DOCUMENTS

| | | | | |
|---|---|---|---|---|
| 2008/0244120 A1* | 10/2008 | Park | ..................... | G06F 13/385 |
| | | | | 710/65 |
| 2015/0103850 A1* | 4/2015 | Wang | ..................... | H04B 10/00 |
| | | | | 370/538 |
| 2017/0024345 A1* | 1/2017 | Babitch | .................. | G01S 19/26 |

OTHER PUBLICATIONS

PCT International Preliminary Report on Patentability with Written Opinion of the Interational Searching Authority for corresponding PCT/JP2021/011459; Issued on Sep. 22, 2022.

DE Office Action issued in corresponding German Application No. 1120210012479, Dated Mar. 7, 2024; 7 pages.

German Office Action for corresponding DE Application No. 112021001247.9; Mailing Date, Oct. 30, 2023.

\* cited by examiner

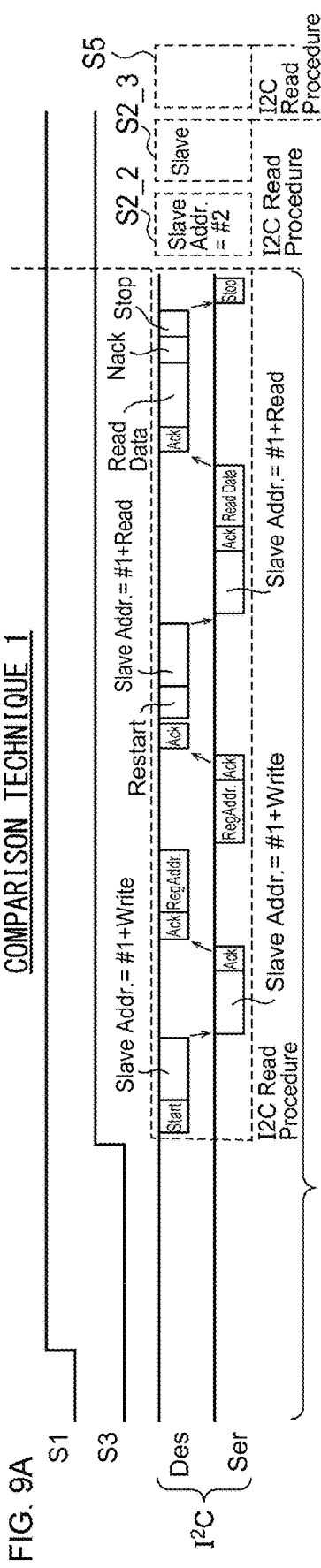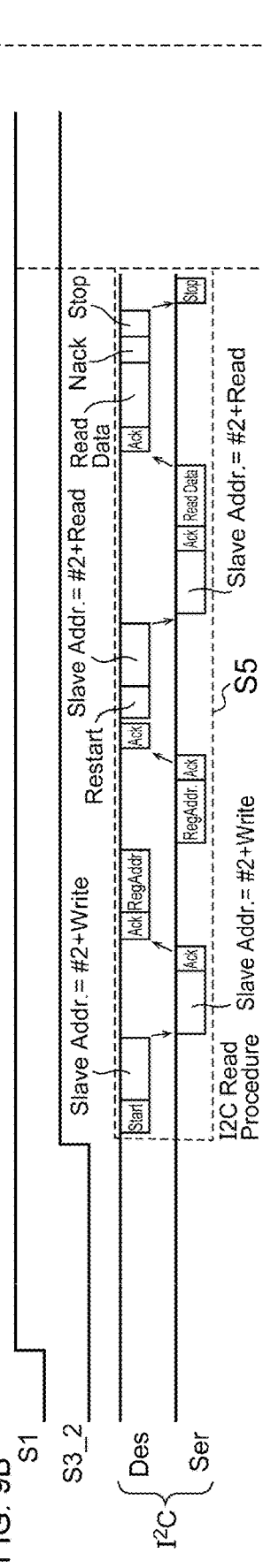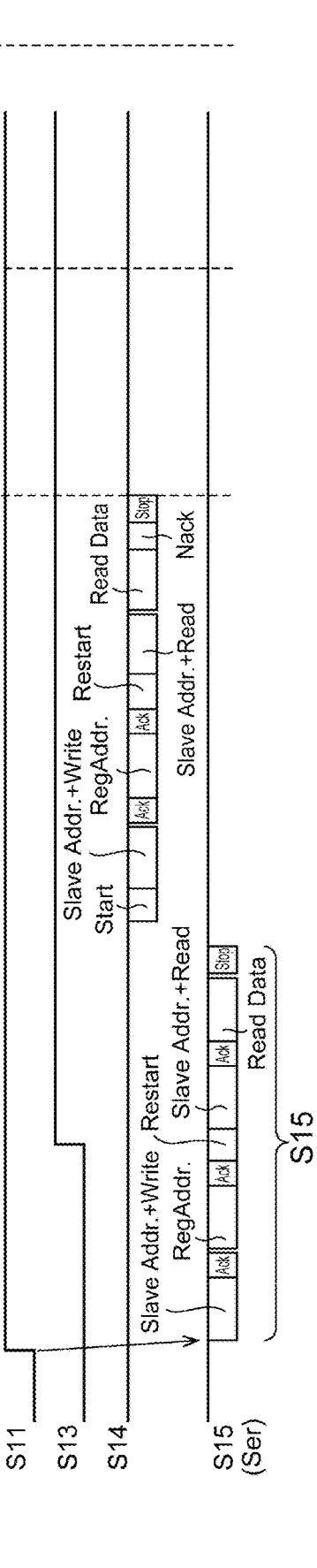

TRANSMISSION SYSTEM

CROSS REFERENCE TO RELATED APPLICATION

This application is a continuation under 35 U.S.C. § 120 of PCT/JP2021/011459, filed Mar. 19, 2021, which is incorporated herein by reference, and which claimed priority to Japanese Application No. 2020-056346, filed Mar. 26, 2020. The present application likewise claims priority under 35 U.S.C. § 119 to Japanese Application No. 2020-056346, filed Mar. 26, 2020, the entire content of which is also incorporated herein by reference.

BACKGROUND

1. Technical Field

The present disclosure relates to a transmission system.

2. Description of the Related Art

In order to support high-speed data transmission between multiple semiconductor devices, a differential serial interface is widely employed. In particular, with a clockless transmission method employing a Clock Data Recovery (CDR) method, by transmitting serial data including embedded clock data, this arrangement supports such high-speed data transmission using a single differential line.

Applications of such a differential serial interface are seen to be expanding. For example, such a differential serial interface is employed to support data transmission between in-vehicle devices included in a vehicle. An AC-coupling interface is disclosed in Patent document 1 (International Publication WO 2008/099523) that requires only a single transmission path to support bidirectional transmission.

FIG. 1 is a block diagram showing a signal processing system 1R. The signal processing system 1R includes multiple devices 2_1 through 2_3 provided in a first area A1, a controller 4 provided in a second area A2 at a distance of several m to several dozen m from the first area A1, and a transmission system 10 that supports bidirectional transmission between the first area A1 and the second area A2. The transmission system 10 includes a serializer 12 provided in the first area A1, a deserializer 14 provided in the second area A2, and a differential transmission path 16 that couples the serializer 12 and the deserializer 14.

The controller 4 is configured as a master controller for the signal processing system 1R. In in-vehicle applications, the controller 4 is configured as a controller that is referred to as an Electronic Control Unit (ECU), Image Signal Processor (ISP), Digital Signal Processor (DSP), or the like.

One of the devices 2_1 through 2_3 (device 2_1, e.g., a camera in this example) provided in the first area A1 generates large-volume data such as image data or the like. The device 2_1 and the serializer 12 are coupled via a high-speed serial interface 20 such as a Mobile Industry Processor Interface (MIPI) or the like. The serializer 12 receives data D1 via the interface 20 and transmits the data D1 to the deserializer 14 via the differential transmission path 16. Furthermore, the deserializer 14 and the controller 4 are coupled via a high-speed serial interface 22 such as MIPI or the like. The data D1 received by the deserializer 14 from the serializer 12 is transmitted to the controller 4 via the high-speed serial interface 22.

In the first area A1, the multiple devices 2_1 through 2_3 are coupled to the serializer 12 via a low-speed serial interface 24 such as an Inter IC ($I^2C$) interface, Serial Peripheral Interface (SPI), or the like. Furthermore, the multiple devices 2_1 through 2_3 are coupled to the serializer 12 via dedicated interrupt signal lines 26_1 through 26_3, respectively.

When an internal error has occurred in any device 2_# (#=1, 2, 3), the device 2_# asserts an error flag ERR at a predetermined address Adr1 in its internal register and writes an error status STATUS that indicates the cause of the error or the like at a predetermined address Adr2. The serializer 12 is able to access the register of each device 2_# via the low-speed serial interface 24.

Furthermore, in the second area A2, the deserializer 14 and the controller 4 are coupled via a low-speed serial interface 28 and an interrupt signal line 30. The controller 4 is capable of issuing a read command to specify a desired address of a desired device 2. The read command issued by the controller 4 is transmitted from the deserializer 14 to the serializer 12. The serializer 12 executes the read command. The serializer 12 transmits the data read as a result of the read command to the deserializer 14. As a response to the original read command, the deserializer 14 transmits the data thus read to the controller 4.

The present inventors have investigated the signal processing system 1R shown in FIG. 1 with regard to the controller 4 integrating the respective status information (error information etc.) of the multiple devices 2. Specifically, the present inventors have investigated comparison techniques 1 and 2.

Comparison Technique 1

FIG. 2 is a diagram showing an example of transmission of the status information from the device 2 to the controller 4 according to the comparison technique 1.

When an abnormality has occurred in the device 2_2, a value of 1 is written to an error flag ERR at the address Adr1 in the register of the error device 2_2. Furthermore, the status information STATUS is written to the address Adr2. The error flag ERR value is set to 0 for each of the non-error devices 2_1 and 2_2.

The device 2_2 asserts an interrupt signal line 26_2 interrupt request IRQ (S1). The interrupt request is transmitted to the controller 6 via the serializer 12 and the deserializer 14. The interrupt request IRQ to be received by the controller 6 indicates the occurrence of an abnormality in any one of the multiple devices 2_1 through 2_3 on the first area A1 side. That is to say, it is not possible to know which device from among the multiple devices 2_1 through 2_3 is the error device.

The controller 4 accesses the respective registers of the devices 2_1 through 2_3 (S2_1 through S2_3) with an assertion of the interrupt signal (S1) as a trigger, so as to read the values of the error flags ERR.

Subsequently, when the controller 4 has detected that the error flag ERR read out from the device 2_2 has a value of 1, the controller 4 judges that the device 2_2 is the error device. Furthermore, the controller 4 accesses the device 2_2 again (S3) so as to read the error status STATUS.

FIG. 3 is a sequence diagram showing the transmission of the status information according to the comparison technique 1. When an error has occurred in the device 2_2, error processing is executed. Specifically, the value of the error flag ERR at the address Adr1 is set to 1, and a value that indicates the cause of the error is written to the error status STATUS at the address Adr2 (S0).

The error device 2_2 transmits the interrupt request IRQ to the serializer 12 (S1a). The serializer 12 transmits the interrupt request IRQ to the deserializer S1b (S1b). The deserializer 14 asserts the interrupt signal line 30 so as to notify the controller 4 of the occurrence of an error (S1c). S1a through S1c shown in FIG. 3 correspond to S1 shown in FIG. 2.

Subsequently, the controller 4 accesses the address Adr1 of the register of the device 2_1 (S2_1) and reads the value of the error flag ERR. S2_1a through S2_1f shown in FIG. 3 correspond to S2_1 shown in FIG. 2. Specifically, the controller 4 issues a read command with the slave address as the device 2_1 and with the address as Adr1 (S2_1a). The read command is transmitted from the deserializer 14 to the serializer 12 (S2_1b). The serializer 12 executes the read command (S2_2c). Specifically, the serializer 12 reads the value of the error flag ERR at the address Adr1 (S2_1d). The serializer 12 transmits the error flag ERR thus read to the deserializer 14 (S2_1e). The deserializer 14 transmits the error flag ERR thus received to the controller 104. Based on the value of the error flag ERR, with such an arrangement, the controller 4 is able to know whether or not an error has occurred in the device 2_1.

In the same manner, the controller 4 reads the error flag ERR for each of the device 2_2 and 2_3 (S2_2a through S2_2f, S2_3a through S2_3f).

S3a through S3f shown in FIG. 3 correspond to S3 shown in FIG. 2. Based on the error flag ERR having a value of 1 read from the device 2_2, the controller 4 is able to know that the device 2_2 is an error device. The controller 4 issues a read command with the address Adr2 of the device 2_2 as a target address (S3a). The read command is transmitted from the deserializer 14 to the serializer 12 (S3b). The deserializer 14 reads the status information STATUS stored in the device 2_2 (S3c through S3d). Subsequently, the status information STATUS thus read is transmitted to the deserializer 14 (S3e). The deserializer 14 transmits the status information STATUS to the controller 4 (S3f).

In the comparison technique 1, four read accesses (S2_1 through S2_3, S3) occur between the deserializer 14 and the serializer 12. This leads to increased time required to acquire the error status STATUS.

Comparison Technique 2

FIG. 4 is a diagram for explaining the transmission of the status information in a signal processing system 1S. In the signal processing system 1S according to the comparison technique 2, interrupt signal lines 30_1 through 30_3 are provided between the deserializer 14 and the controller 4 for the respective devices 2.

When an abnormality has occurred in the device 2_2, a value of 1 is written to the error flag ERR at the address Adr1 of the register of the error device 2_2. Furthermore, the status information STATUS is written to the address Adr2. On the other hand, the value of the error flag ERR is set to 0 for each of the non-error devices 2_1 and 2_3.

The device 2_2 asserts the interrupt request IRQ of the interrupt signal line 26_2 (S_1). The interrupt request is transmitted to the controller 6 via the serializer 12 and the deserializer 14. The deserializer 14 uses one interrupt signal line 30_2 that corresponds to the error device 2_2 from among the three interrupt signal lines 30_1 through 30_3 to transmit the interrupt request IRQ to the controller 4. In this stage, the controller 4 is able to know that the device 2_2 is an error device.

The controller 4 read-accesses the address Adr2 of the register of the device 2_2 with the assertion of the interrupt signal (S1) as a trigger, so as to read the status information STATUS.

FIG. 5 is a sequence diagram showing the transmission of the status information according to the comparison technique 2. When an error has occurred in the device 2_2, error processing is executed, and the value of the error flag ERR at the address Adr1 is set to 1. Furthermore, a value that indicates the cause of the error is written to the error status STATUS at the address Adr2 (S0).

The error device 2_2 transmits the interrupt request IRQ to the serializer 12 (S1a). The serializer 12 transmits the interrupt request IRQ to the deserializer S1b (S1b). The deserializer 14 asserts the interrupt signal line 30_2 so as to notify the controller 4 of the occurrence of the error (S1c). S1a through S1c shown in FIG. 5 correspond to S1 shown in FIG. 4. In this stage, the controller 4 knows that the device 2_2 is an error device.

The controller 4 read-accesses the address Adr2 of the device 2_2 so as to read the status information STATUS (S3a through S3f). S3a through S3f are the same as those shown in FIG. 3.

With the comparison technique 2, this allows the number of read accesses between the serializer 12 and the deserializer 14 to be reduced to one. However, such an arrangement requires the interrupt signal lines 30_1 through 30_3 between the deserializer 14 and the controller 4, the number of which corresponds to the number of the devices 2. In addition, such an arrangement has a problem of an increased number of pins of the deserializer 14 and the controller 4.

SUMMARY

The present disclosure has been made in view of such a situation.

A transmission system according to an embodiment of the present disclosure relates to a transmission system. The transmission system includes: a serializer provided in a first area, and coupled to multiple devices provided in the first area via multiple interrupt signal lines and a first interface; and a deserializer provided in a second area, structured to receive serial data from the serializer, and coupled to a controller provided in the second area via a second interrupt line and a second interface. Upon receiving an interrupt request via any one from among the multiple first interrupt signal lines, the serializer is structured to identify an error device that has transmitted the interrupt request from among the multiple devices, and to transmit an identification number of the error device to the deserializer. Furthermore, the serializer is structured to read status information from the error device via the first interface, and to transmit the status information of the error device to the deserializer. The deserializer is structured to store the identification number of the error device and the status information in an internal register, to transmit an interrupt request to the controller via the second interrupt signal line, and to transmit the identification number and the status information of the error device in response to a read access from the controller after the controller receives the interrupt request via the second interrupt signal line.

Another embodiment of the present disclosure relates to a signal processing system. The signal processing system includes: multiple devices provided in a first area; a serializer provided in the first area; multiple first interrupt signal lines structured to couple the multiple devices and the serializer; a first interface structured to couple the multiple devices and the serializer; a deserializer provided in a second area, and structured to receive serial data from the serializer; a controller provided in the second area; a second interrupt signal line structured to couple the deserializer and the controller; and a second interface structured to couple the deserializer and the controller. The multiple devices are each structured to transmit an interrupt request to the serializer via a corresponding one from among the multiple first interrupt signal lines when an abnormality occurs. Upon receiving an interrupt request via any one from among the multiple first interrupt signal lines, the serializer is structured to identify an error device which is one device that has transmitted the interrupt request from among the multiple devices, to transmit an identification number of the error device to the deserializer, to read status information from the error device, and to transmit the status information of the error device to the deserializer. The deserializer is structured to store the identification number of the error device and the status information in an internal register thereof, and to transmit an interrupt request to the controller via the second interrupt signal line. Upon receiving an interrupt request via the second interrupt signal line, the controller is structured to read the identification number of the error device and the status information from the register of the deserializer via the second interface.

Another embodiment of the present disclosure relates to a serializer. The serializer is structured to be transmit serial data to a deserializer. The serializer includes: a serial interface circuit structured to communicate with multiple devices; multiple interrupt pins structured to receive interrupt requests from the multiple devices; a transmitter structured to transmit data to the serializer; and a logic circuit structured to monitor the multiple interrupt pins, and such that, upon detecting an interrupt request from an error device which is one from among the multiple devices, the logic circuit is structured to transmit an identification number of the error device to the serializer via the transmitter, to access the error device via the serial interface circuit so as to read status information, and to transmit the status information to the deserializer via the transmitter.

Yet another embodiment of the present disclosure relates to a deserializer. The deserializer is structured to receive serial data from a serializer. The deserializer includes: a serial interface circuit structured to communicate with a controller; an error output pin coupled to the controller via an interrupt signal line; and a receiver structured to receive an identification number of an error device and status information from the serializer. Upon receiving the identification number of the error device from the serializer, the receiver transmits an interrupt request to the controller via the error output pin. Upon receiving a read access from the controller in response to the interrupt request, the serial interface circuit transmits the identification number and the status information of the error device to the controller in response to the read access.

It should be noted that any combination of the components described above, or manifestation of the present disclosure may be mutually substituted between a method, apparatus, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 9A through FIG. 9C are time charts showing the transactions according to the comparison technique 1, the comparison technique 2, and the embodiment.

DETAILED DESCRIPTION

Outline of Embodiments

Figure 1:
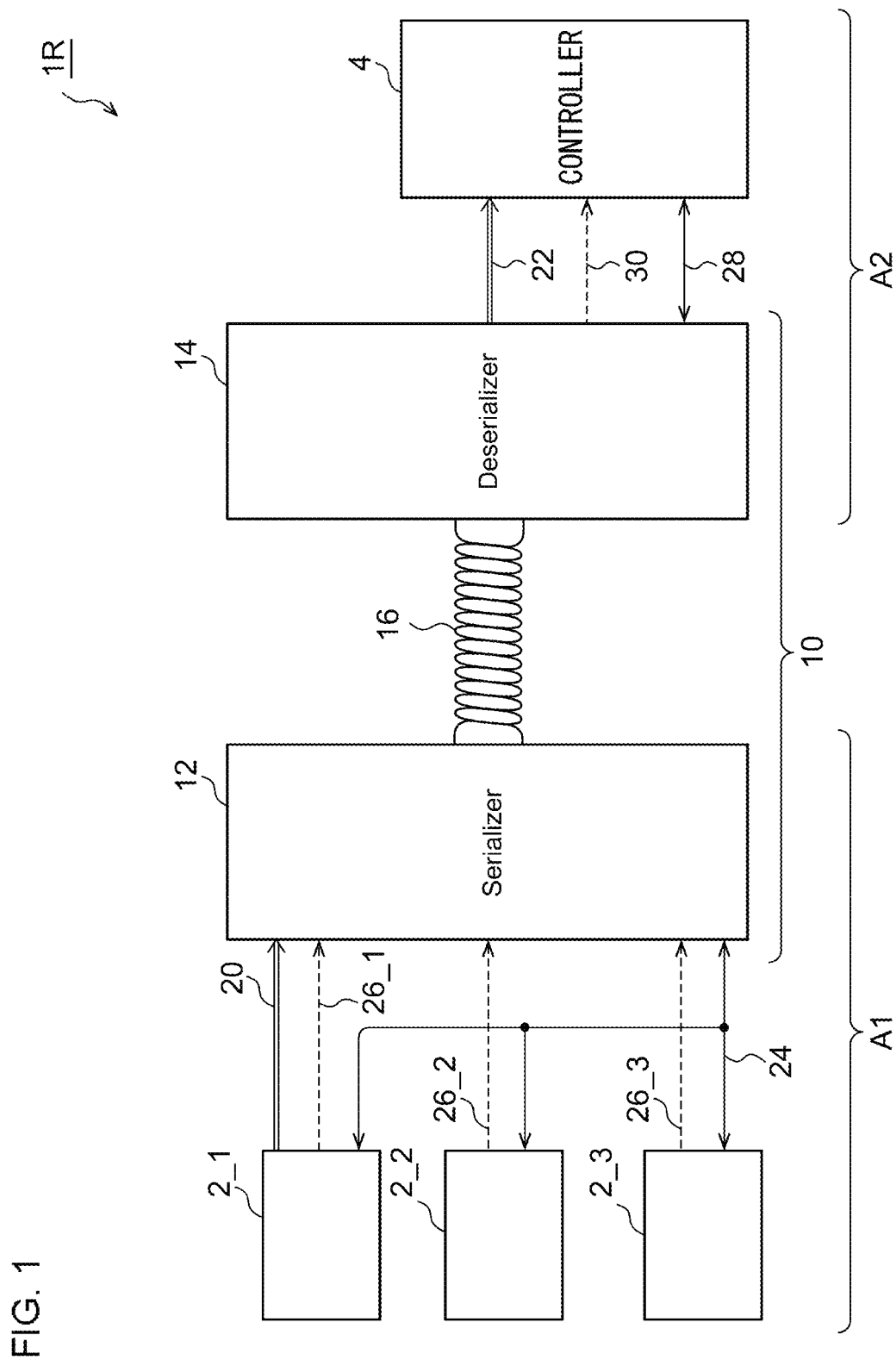
FIG. 1 is a block diagram showing a signal processing system.
Figure 2:
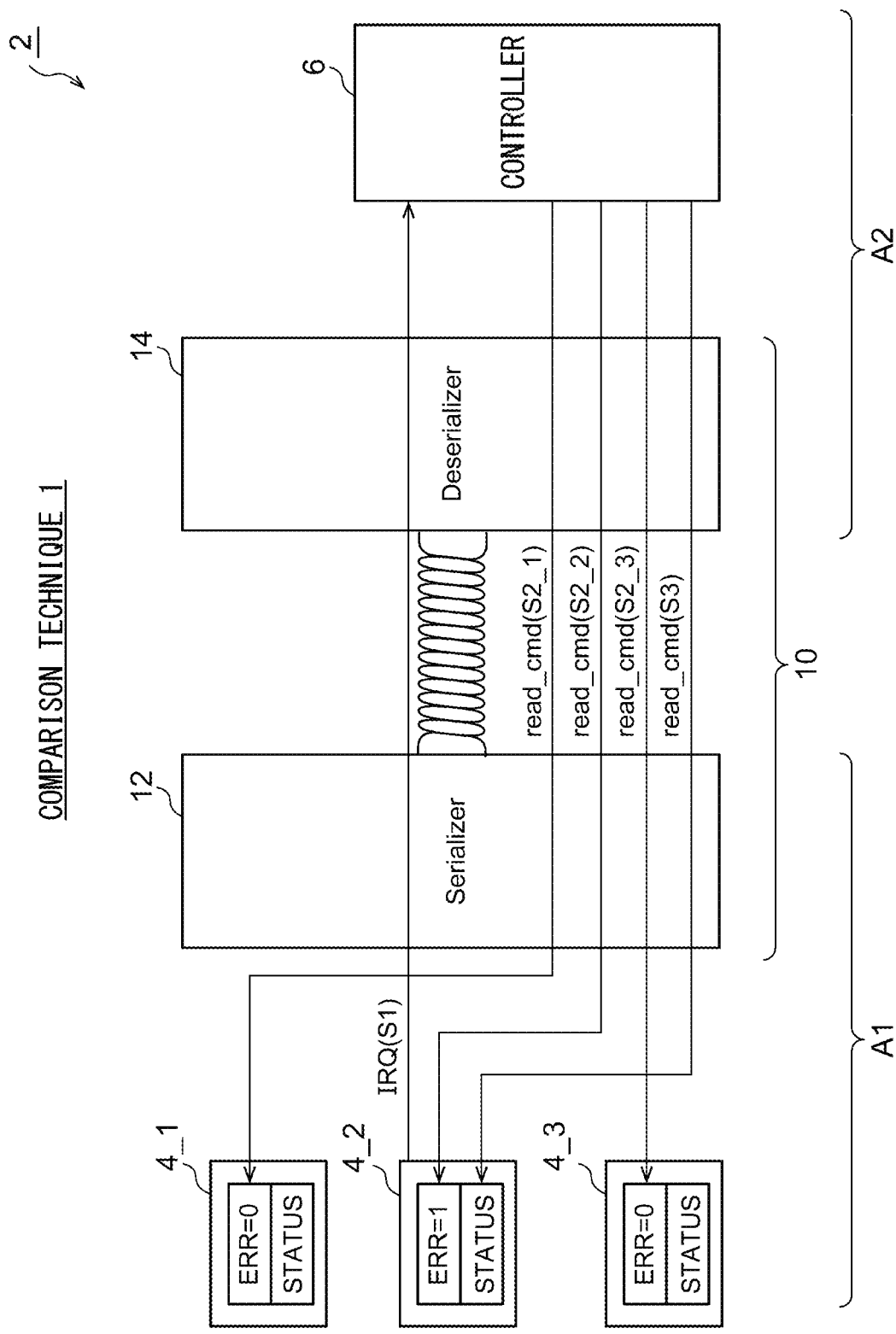
FIG. 2 is a diagram showing an example of the transmission of status information from a device to a controller according to a comparison technique 1.
Figure 3:
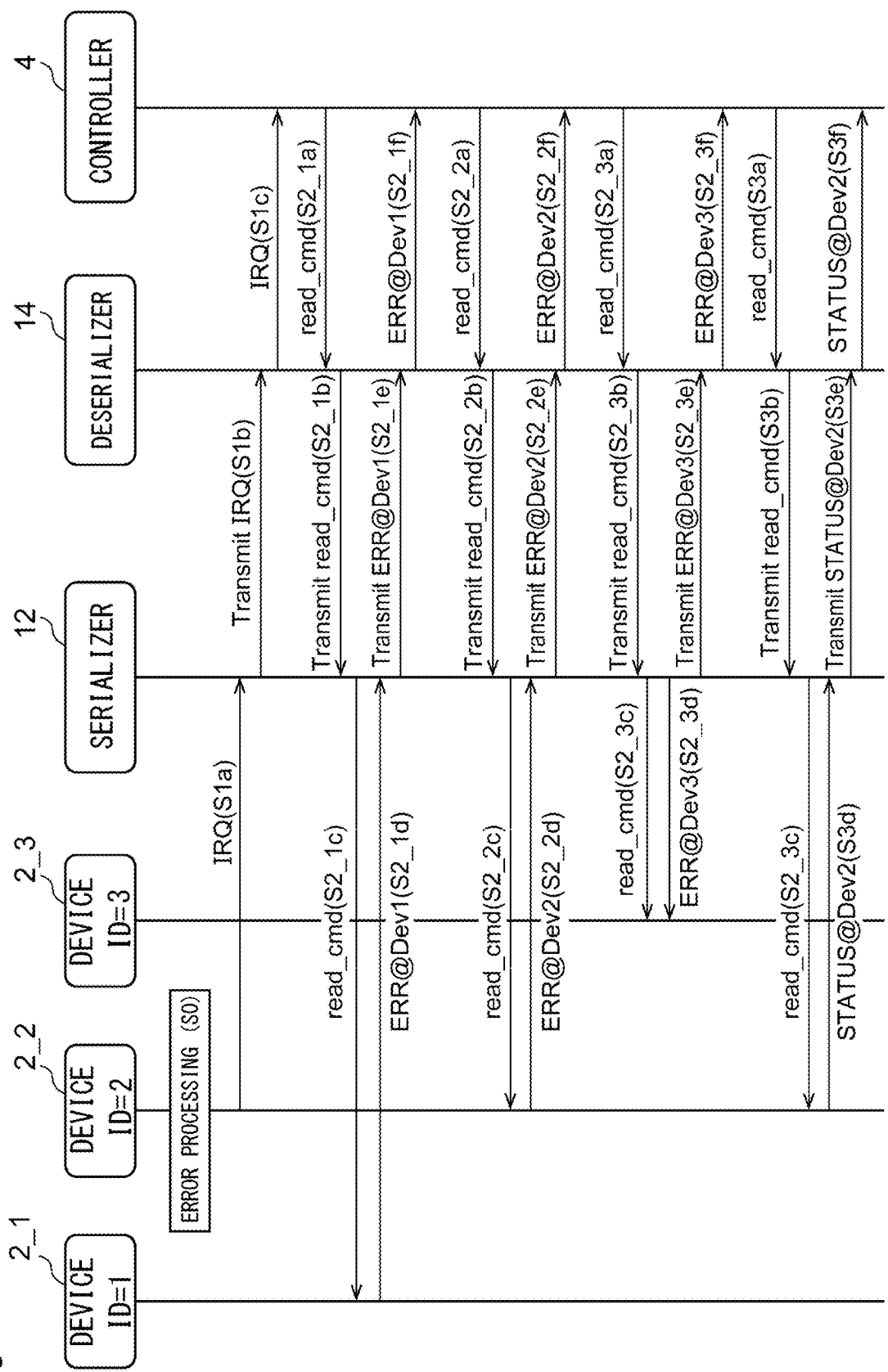
FIG. 3 is a sequence diagram of the transmission of the status information according to the comparison technique 1.
Figure 4:
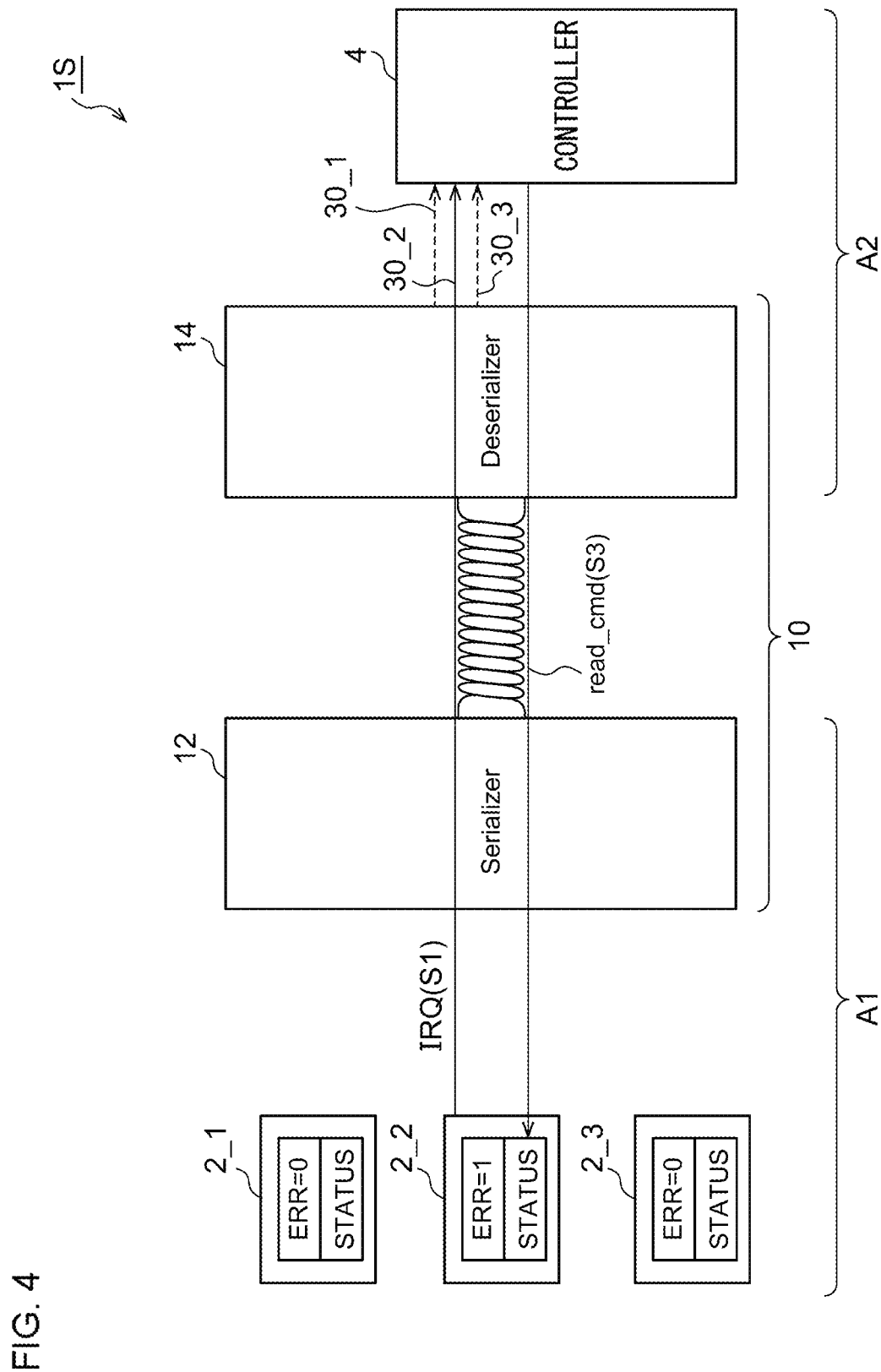
FIG. 4 is a diagram for explaining the transmission of the status information in a signal processing system.
Figure 5:
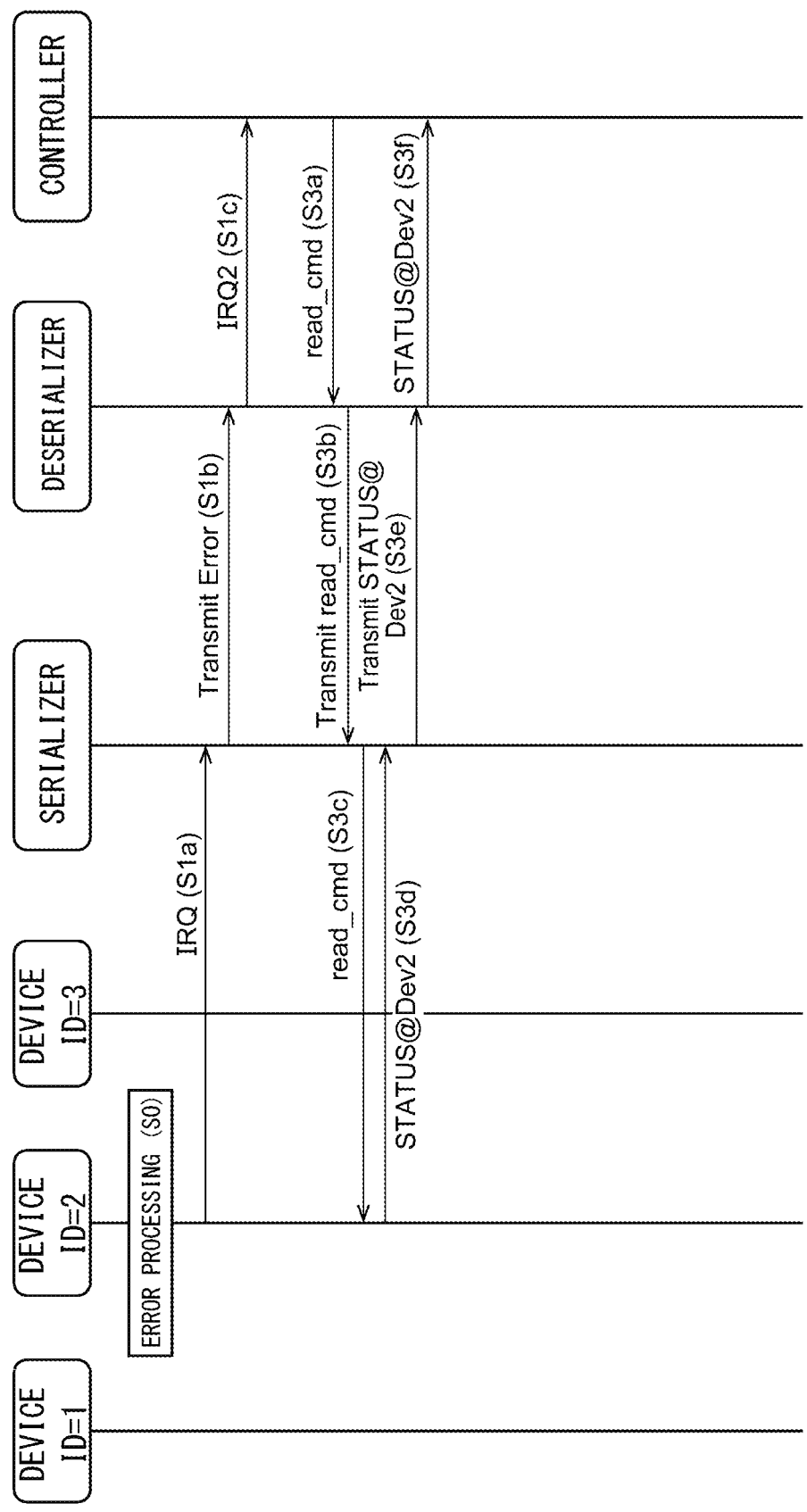
FIG. 5 is a sequence diagram showing the transmission of the status information according to a comparison technique 2.

Description will be made regarding an outline of several example embodiments of the present disclosure. In this outline, some concepts of one or multiple embodiments will be described in a simplified form as a prelude to the more detailed description that is presented later in order to provide a basic understanding of such embodiments. Accordingly, the outline is by no means intended to restrict the scope of the present invention or the present disclosure. Furthermore, this outline is not an extensive overview of all conceivable embodiments and is by no means intended to restrict essential elements of the embodiments. In some cases, for convenience, the term "one embodiment" may be used herein to refer to a single embodiment (example or modification) or multiple embodiments (examples or modifications) disclosed in the present specification.

The outline is not meant to be an extensive outline of all conceivable embodiments. Furthermore, the outline is not intended to identify essential elements of all the embodiments or specific essential elements, nor to define the scope of part of or all the embodiments. The sole purpose of the outline is to propose several concepts of one or multiple embodiments in a simplified form as a prelude to the more detailed description that is presented later.

A transmission system according to an embodiment includes: a serializer provided in a first area, and coupled to multiple devices provided in the first area via multiple interrupt signal lines and a first interface; and a deserializer provided in a second area, structured to receive serial data from the serializer, and coupled to a controller provided in the second area via a second interrupt line and a second interface. Upon receiving an interrupt request via any one from among the multiple first interrupt signal lines, the serializer is structured to identify an error device that has transmitted the interrupt request from among the multiple devices, and to transmit an identification number of the error device to the deserializer. Furthermore, the serializer is structured to read status information from the error device via the first interface, and to transmit the status information of the error device to the deserializer. The deserializer is structured to store the identification number of the error device and the status information in an internal register, to transmitting an interrupt request to the controller via the second interrupt signal line, and to transmit the identification number and the status information of the error device in response to a read access from the controller after the controller receives the interrupt request via the second interrupt signal line.

This arrangement requires no read access via a deserializer and a serializer, thereby allowing the controller to acquire the status information in a short period of time. In addition, this arrangement requires only one interrupt signal line between the deserializer and the controller.

In an embodiment, the serializer may be coupled to a main device which is one from among the multiple devices via a third interface. Also, the deserializer may be coupled to the controller via a fourth interface. Also, the serializer may receive main data generated by the main device via the third interface, and may transmit the main data to the deserializer. Also, the deserializer may transmit the main data received from the serializer to the controller via the fourth interface.

In an embodiment, the main device may be a camera. Also, the main data may include image data.

A signal processing system according to an embodiment includes: multiple devices provided in a first area; a serializer provided in the first area; multiple first interrupt signal lines structured to couple the multiple devices and the serializer; a first interface structured to couple the multiple devices and the serializer; a deserializer provided in a second area, and structured to receive serial data from the serializer; a controller provided in the second area; a second interrupt signal line structured to couple the deserializer and the controller; and a second interface structured to couple the deserializer and the controller. The multiple devices are each structured to transmit an interrupt request to the serializer via a corresponding one from among the multiple first interrupt signal lines when an abnormality occurs. Upon receiving an interrupt request via any one from among the multiple first interrupt signal lines, the serializer is structured to identify an error device which is one device that has transmitted the interrupt request from among the multiple devices, to transmit an identification number of the error device to the deserializer, to read status information from the error device, and to transmit the status information of the error device to the deserializer. The deserializer is structured to store the identification number of the error device and the status information in an internal register thereof, and to transmit an interrupt request to the controller via the second interrupt signal line. Upon receiving an interrupt request via the second interrupt signal line, the controller is structured to read the identification number of the error device and the status information from the register of the deserializer via the second interface.

A serializer according to an embodiment is structured to transmit serial data to a deserializer. The serializer includes: a serial interface circuit structured to communicate with multiple devices; multiple interrupt pins structured to receive interrupt requests from the multiple devices; a transmitter structured to transmit data to the serializer; and a logic circuit structured to monitor the multiple interrupt pins, and such that, upon detecting an interrupt request from an error device which is one from among the multiple devices, the logic circuit is structured to transmit an identification number of the error device to the serializer via the transmitter, to access the error device via the serial interface circuit so as to read status information, and to transmit the status information to the deserializer via the transmitter.

A deserializer according to an embodiment is structured to receive serial data from a serializer. The deserializer includes: a serial interface circuit structured to communicate with a controller; an error output pin coupled to the controller via an interrupt signal line; and a receiver structured to receive an identification number of an error device and status information from the serializer. Upon receiving the identification number of the error device from the serializer, the receiver transmits an interrupt request to the controller via the error output pin. Upon receiving a read access from the controller in response to the interrupt request, the serial interface circuit transmits the identification number and the status information of the error device to the controller in response to the read access.

Embodiments

Description will be made below regarding the present disclosure with reference to the drawings. In each drawing, the same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

Figure 6:
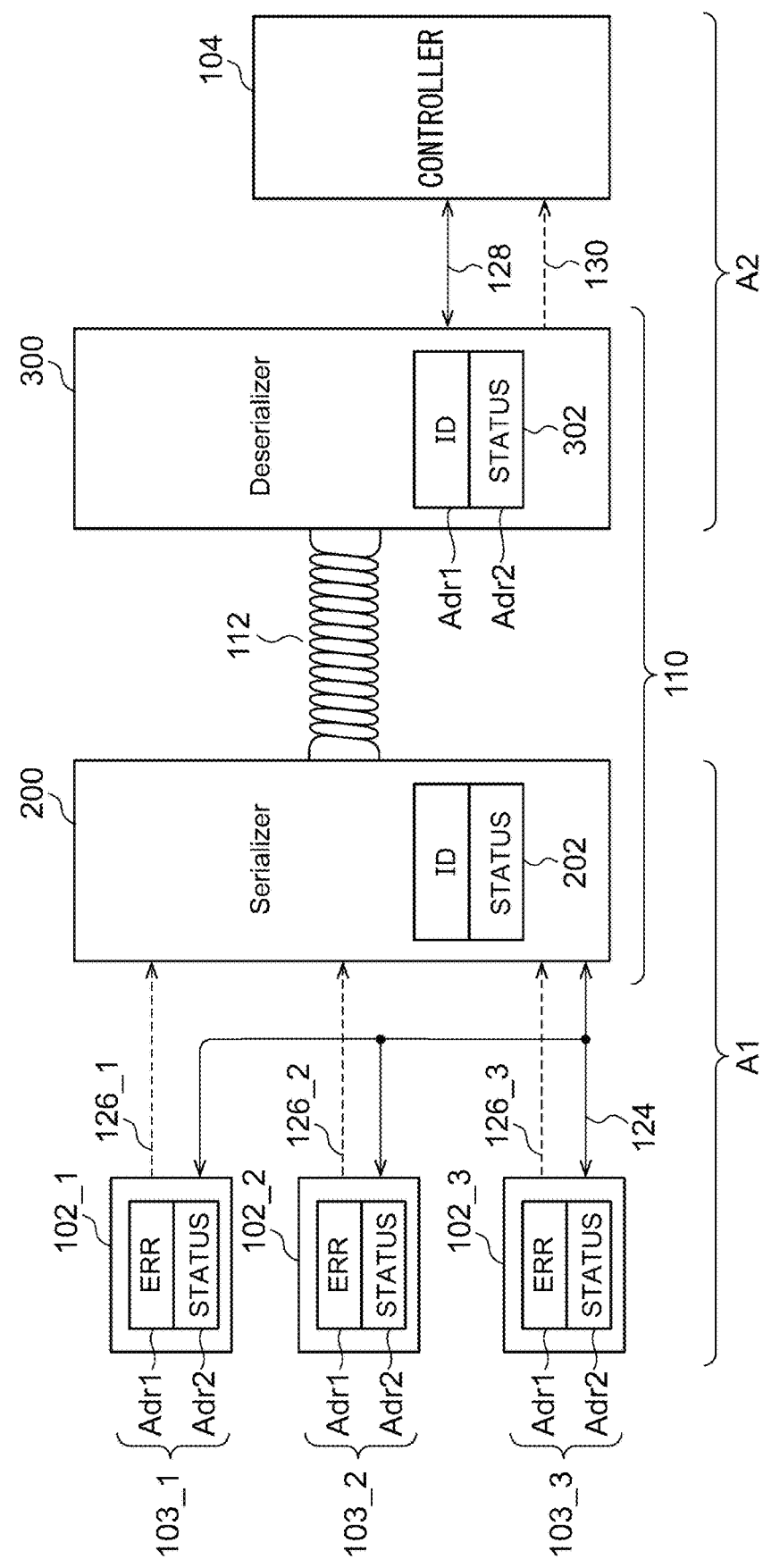
FIG. 6 is a block diagram showing a signal processing system provided with a transmission system according to an embodiment.

FIG. 6 is a block diagram showing a signal processing system 100 provided with a transmission system 110 according to an embodiment. The signal processing system 100 includes a transmission system 110, a plurality of N (N≥2) devices 102_1 through 102_N, and a controller 104. Description will be made in the present embodiment regarding an arrangement in which N=3.

A serializer 200 is provided in a first area A1. The serializer 200 is coupled to the multiple devices 102_1 through 102_3 via a low-speed first interface 124. The first interface 124 is not restricted in particular. As the first interface 124, a serial interface configured as an on-board serial interface, near-distance serial interface, or the like may be employed. Examples of the first interface 124 includes I²C or SPI with the serializer 200 as a master device and with the multiple devices 102_1 through 102_3 as slave devices. The multiple devices 102_1 through 102_3 each have a unique identification number (slave address).

Each device 102_# (#=1, 2, 3) has a register 103_#. When an error has occurred in a device 102_#, the value (error flag ERR) at an address Adr1 of its internal register 103_# is set to 1. Furthermore, a value that indicates the cause of the error or the like is written to an address Adr2 (status information STATUS).

The serializer 200 specifies the slave address, and issues a read command to the multiple devices 102_1 through 102_3. The read command includes the address of the register to be read. From among the multiple devices 102_1 through 102_3, the device that matches the slave address transmits the data stored at the specified address to the serializer 200.

Furthermore, the serializer 200 is coupled to the multiple devices 102_1 through 102_3 provided in the first area A1 via multiple first interrupt signal lines 126_1 through 126_3. When an abnormality has occurred in any one of the multiple devices 102_1 through 102_3, the corresponding device 102_# transmits an interrupt request (IRQ) to the serializer 200 via the corresponding one from among the multiple first interrupt signal lines 126_1 through 126_3.

Upon receiving the interrupt request IRQ via any one of the multiple first interrupt signal lines 126_1 through 126_3, the serializer 200 identifies the one error device 102_# that has transmitted the interrupt request from among the multiple devices 102. The identification number ID of the error device 102 thus identified is stored in the memory (register) 202 of the serializer 200. The serializer 200 transmits the identification number ID thus stored in the memory 202 to a deserializer 300 via a differential transmission path 112.

Furthermore, the serializer 200 issues a read command to the error device 102_# via the first interface 124 so as to read the status information STATUS, and stores the status information STATUS in the memory 202. The serializer 200 transmits the status information STATUS thus stored in the memory 202 to the deserializer 300 via the differential transmission path 112.

The deserializer 300 and the controller 104 are provided in the second area A2. The deserializer 300 and the controller 104 are coupled via a low-speed second interface 128. The second interface 128 is not restricted in particular. As with the first interface 124, an interface configured as an on-board interface, near-distance interface, or the like such as I²C or SPI may be employed. The controller 104 is assigned as a master controller, and the deserializer 300 is assigned as a slave device.

Furthermore, the deserializer 300 and the controller 104 are coupled via a second interrupt signal line 130.

The deserializer 300 stores the identification number ID of the error device 102_# and the status information STATUS thereof received from the serializer 200 in an internal register 302. Description will be made assuming that the identification number ID is stored at the address Adr1, and the status information STATUS is stored at the address Adr2.

Upon receiving the identification number ID of the error device 102_# from the serializer 200, the deserializer 300 transmits the interrupt request IRQ to the controller 104 via the second interrupt signal line 130.

Upon receiving the interrupt request IRQ via the second interrupt signal line 130, the controller 104 issues the read command to the deserializer 300 via the second interface 128. The read command includes the addresses in the register 302 at which the identification number ID and the status information STATUS are to be stored. The deserializer 300 transmits the identification number ID of the error device 102 and the status information STATUS thereof to the controller 104 in response to the read access from the controller 104.

The above is the configuration of the transmission system 110 and the signal processing system 100.

Figure 7:
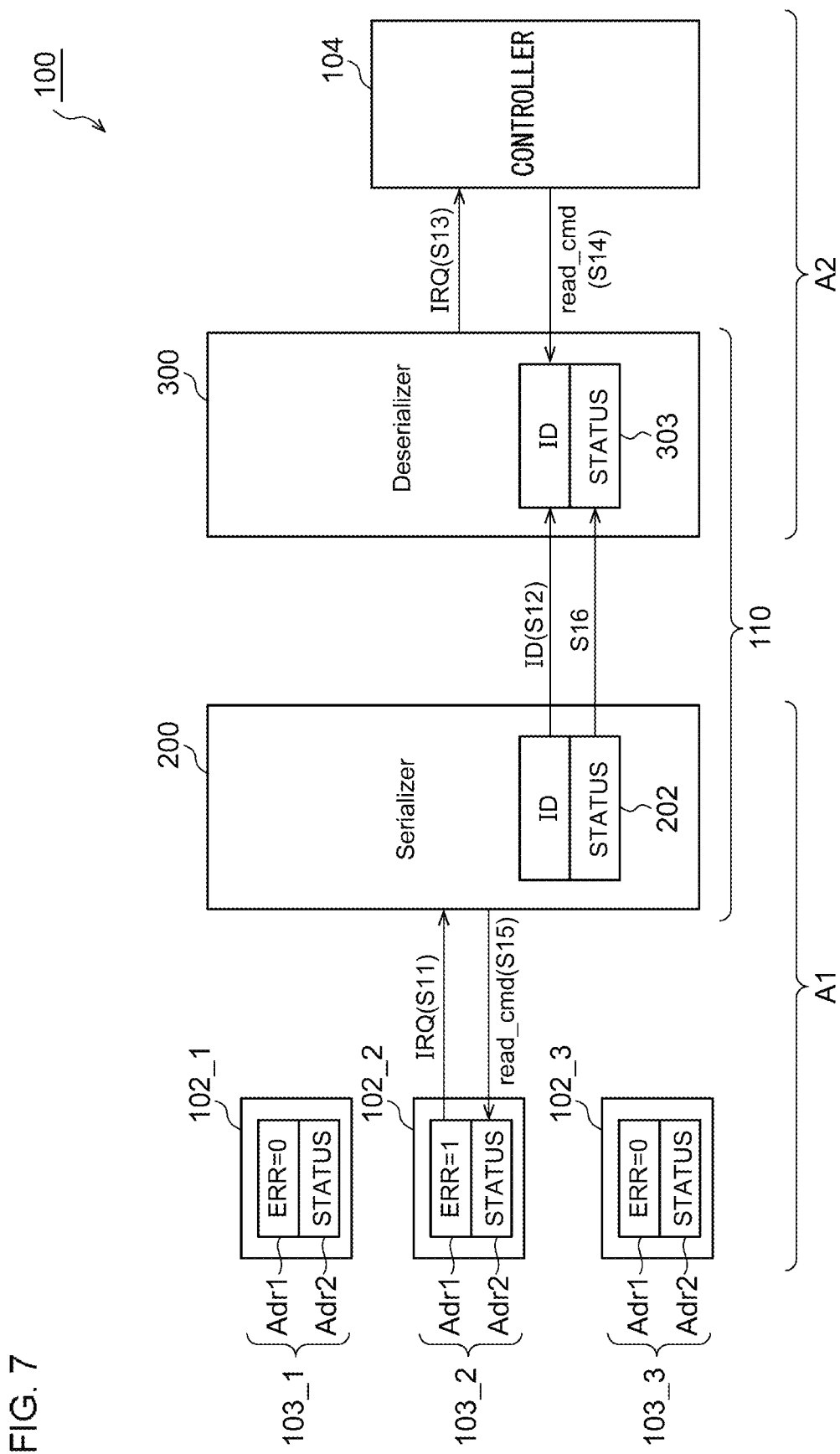
FIG. 7 is a diagram for explaining the transmission of the status information from a device to a controller in the signal processing system shown in FIG. 6.

Next, description will be made regarding the operation thereof. FIG. 7 is a diagram for explaining the transmission of the status information from the device 102 to the controller 104 in the signal processing system 100 shown in FIG. 6.

When an abnormality occurs in the device 102_2, a flag that indicates the occurrence of the abnormality and its cause (status information) are stored in the internal register 103_2 of the device 102_2. The device 102_2 asserts the interrupt request IRQ of the interrupt signal line 126_2 so as to notify the serializer 200 of the occurrence of the abnormality (S11).

The serializer 200 identifies the device 102_2 as an error device in response to the interrupt request IRQ. Subsequently, the serializer 200 transmits the identification number ID of the device 102_2 to the deserializer 300 via the differential transmission path 112 (S12). The deserializer 300 stores the identification number ID thus received in the register 302. Furthermore, the deserializer 300 transmits the interrupt request IRQ to the controller 104 via the second interrupt signal line 130 (S13).

In response to the interrupt request IRQ (S13), the controller 104 issues a read command read_cmd to the register 302 of the deserializer 300 (S14).

On the other hand, the serializer 200 issues a read command read_cmd to the error device 102_2 (S15), so as to read the status information STATUS from the address Adr2 of the register 103_2 of the error device 102_2. Furthermore, the serializer 200 stores the status information STATUS thus read in the register 302.

Subsequently, the serializer 200 transmits the status information STATUS to the deserializer 300 (S16). The status information STATUS is stored at the address Adr2 in the register 303. The status information STATUS is transmitted to the controller 104 in response to the read command (S14) issued by the controller 104 in the previous stage.

Figure 8:
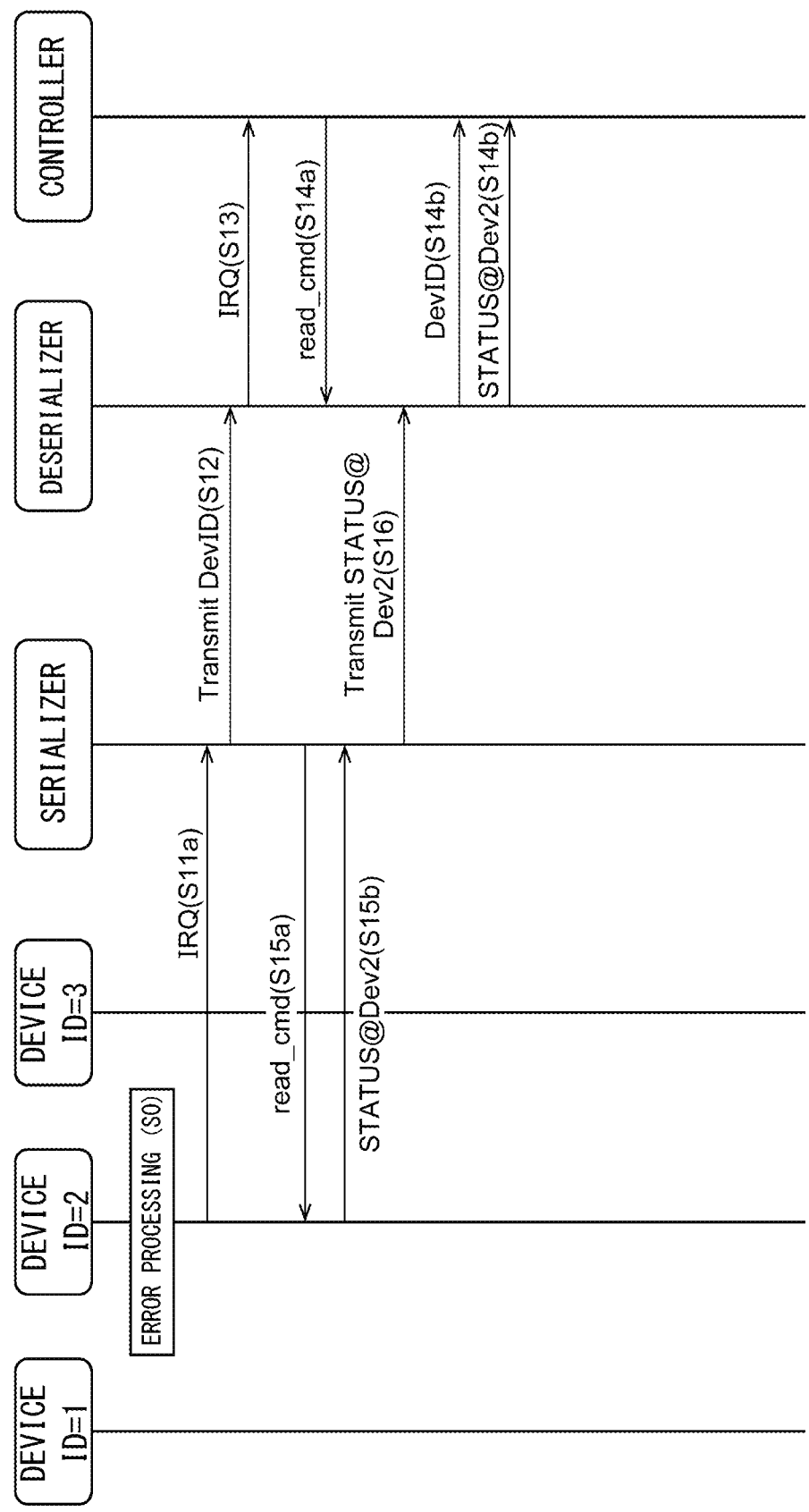
FIG. 8 is a sequence diagram showing the transmission of the status information in the signal processing system shown in FIG. 6.

FIG. 8 is a sequence diagram showing the transmission of the status information in the signal processing system 100 shown in FIG. 6.

Description will be made below assuming that an error has occurred in the second device 102_2. Error processing is executed in the device 102_2 (S10), so as to assert the interrupt request IRQ to the serializer 200 (S11a). The serializer 200 transmits the device ID (DevID) of the device 102_2 that asserted the interrupt request IRQ to the deserializer 300 (S12). Upon receiving the device ID, the deserializer 300 asserts the interrupt request IRQ to the controller 104 (S13).

In response to the interrupt request (S13), the controller 104 issues the read command read_cmd to the register 302 of the deserializer 300 (S14a).

On the other hand, the serializer 200 issues the read command read_cmd to the error device 102_2 (S15a), so as to read out the status information STATUS from the address Adr2 of the register 103_2 of the error device 102_2 (S15b). Furthermore, the serializer 200 stores the status information STATUS thus read in the register 302.

Subsequently, the serializer 200 transmits the status information STATUS to the deserializer 300 (S16). The status information STATUS is stored at the address Adr2 in the register 303. In response to the read command issued by the controller 104 in the previous stage (S14a), the status information STATUS is transmitted to the controller 104 together with the device ID (S14*b*).

FIGS. 9A through 9C are time charts showing the transactions in the comparison techniques 1 and 2 and the embodiment.

Description will be made with reference to FIG. 9A. In the comparison technique 1, four read accesses (S2_1 through S2_3, S5) between the deserializer 14 and the serializer 12 are required. This leads to increased time required to acquire the error status STATUS.

Description will be made with reference to FIG. 9B. In the comparison technique 2, one read access between the deserializer 14 and the serializer 12 (S5) is required. However, such an arrangement requires an interrupt signal line and a pin for each device, leading to an increased scale of the hardware.

Description will be made with reference to FIG. 9C. In the present embodiment, the serializer 200 read-accesses (S15) the error device with the assertion (S11) of the interrupt signal as a trigger, so as to acquire the status information.

The serializer 200 transmits the status information thus acquired to the deserializer 300. In response to the interrupt request S13, the controller 104 read-accesses the deserializer 300 so as to acquire the status information and the error device ID (S14).

As described above, with the present embodiment, the read access (S15) is executed without a request from the deserializer as shown in FIGS. 9A and 9B, thereby providing high-speed read access.

Next, description will be made regarding example configurations of the serializer 200 and the deserializer 300.

Figure 10:
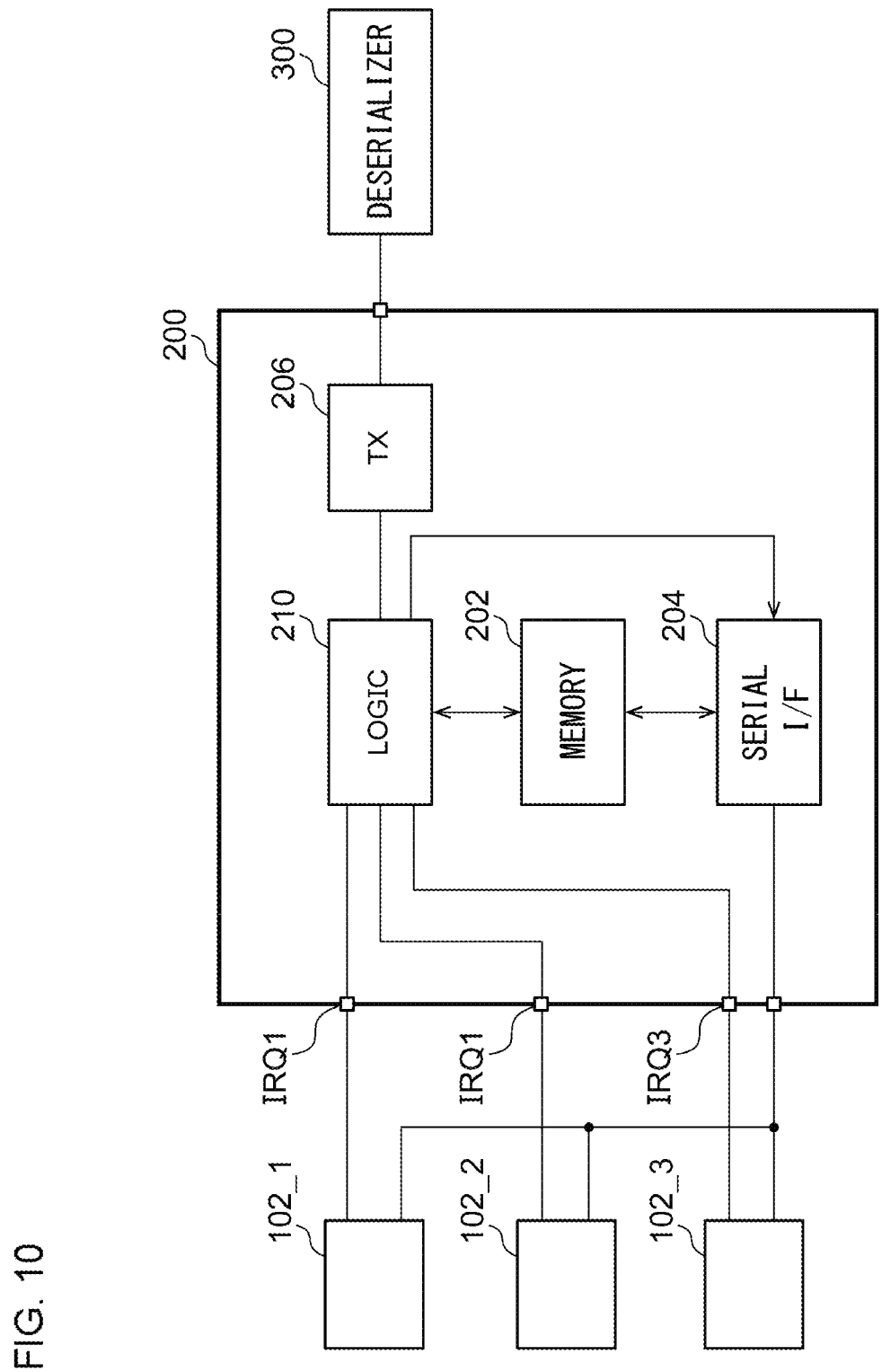
FIG. 10 is a block diagram showing an example configuration of a serializer.

FIG. 10 is a block diagram showing an example configuration of the serializer 200. The serializer 200 includes memory 202, a serial interface circuit 204, a transmitter 206, a logic circuit 210, and multiple interrupt pins IRQ1 through IRQ3. It should be noted that the number of devices that can be coupled to the serializer 200 is not restricted to three.

The serial interface circuit 204 is configured to be capable of communicating with multiple devices 102. The serial interface circuit 204 may conform to I²C or Serial Peripheral Interface (SPI). However, the present invention is not restricted to such an arrangement.

The multiple interrupt pins IRQ1 through IRQ3 are coupled to the multiple devices 102_1 through 102_3 so as to allow the interrupt requests to be received.

The transmitter 206 transmits data to the deserializer 300. The logic circuit 210 monitors the multiple interrupt pins IRQ1 through IRQ3. Upon detecting an interrupt request IRQ # from any error device 102_# from among the multiple devices 102_1 through 102_3, the logic circuit 210 transmits the ID of the error device 102_# to the deserializer 300 via the transmitter 206.

Furthermore, the logic circuit 210 accesses the error device 102_# via the serial interface circuit 204 so as to read the status information STATUS. The logic circuit 210 stores the status information STATUS in the memory 202.

The logic circuit 210 transmits the identification number and status information STATUS of the error device 102 to the deserializer 300 via the transmitter 206.

Figure 11:
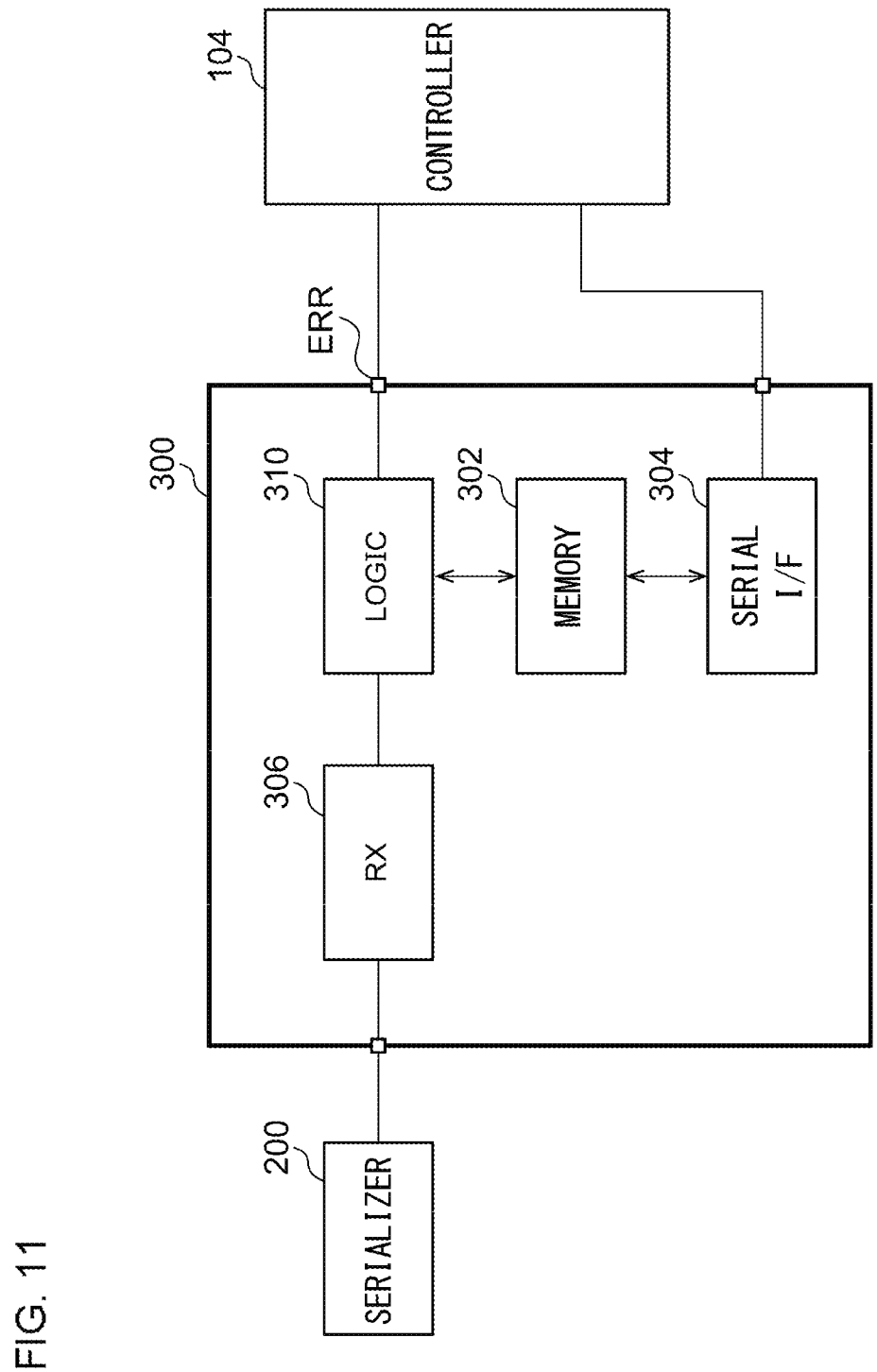
FIG. 11 is a block diagram showing an example configuration of a deserializer.

FIG. 11 is a block diagram showing an example configuration of the deserializer 300. The deserializer 300 includes a register 302, a serial interface circuit 304, a receiver 306, a logic circuit 310, and an error output pin ERR.

The error output pin ERR is coupled to the interrupt pin IRQ of the controller 104 via the interrupt signal line.

The serial interface circuit 304 is configured to be capable of communicating with the controller 104. The serial interface circuit 304 may conform to I²C or Serial Peripheral Interface (SPI). However, the present invention is not restricted to such an arrangement.

The receiver 306 receives serial data from the transmitter 206 of the serializer 200. The serial data includes the identification number and the status information of the error device.

When the receiver 306 receives the identification number of the error device 102 from the serializer 200, the logic circuit 310 transmits the interrupt request IRQ to the controller 104 via the error output pin ERR.

Upon receiving the read access from the controller 104 in response to the interrupt request IRQ, the serial interface circuit 304 transmits the identification number and the status information of the error device 102 to the controller 104 in response to the read access.

The above-described embodiments have been described for exemplary purposes only. Rather, it can be readily conceived by those skilled in this art that various modifications may be made by making various combinations of the aforementioned components or processes, which are also encompassed in the technical scope of the present invention. Description will be made below regarding such modifications.

Description has been made with reference to the sequence diagram shown in FIG. 8 regarding an arrangement in which the controller 104 issues the read command once in response to the interrupt request IRQ (S13) so as to read the identification number and the status information of the error device. However, the present invention is not restricted to such an arrangement.

Upon receiving the identification number of the error device (S12), the deserializer 300 may issue the interrupt request IRQ. Furthermore, upon receiving the status information of the error device (S16), the deserializer 300 may issue the interrupt request IRQ. In response to these two interrupt requests, the controller 104 may read the identification information and the status information of the error device.

Description has been made with reference to the sequence diagram shown in FIG. 8 regarding an arrangement in which the serializer 200 transmits the identification number of the error device to the deserializer 300 (S12) before reading the status information of the error device (S15*a*). However, the present invention is not restricted to such an arrangement. Also, the serializer 200 may transmit the identification number and the status information to the deserializer 300 after reading the status information of the error device.

Usage

The signal processing system 100 is applicable to an in-vehicle communication system. However, the present invention is not restricted to such a usage. For example, an automobile is provided with one or multiple cameras. The images captured by the cameras are integrated in an in-vehicle ECU. However, the distance between each camera and the ECU is approximately several m, i.e., is very long. The transmission system 110 including the serializer 200 and the deserializer 300 is applicable to the data transmission over such a long distance. Each camera corresponds to one of the multiple devices 102. The ECU corresponds to the controller 104.

Various modifications and various changes in the layout can be made for the embodiments without departing from the spirit and scope of the present invention defined in appended claims.

What is claimed is:

1. A transmission system comprising:
a serializer provided in a first area, and coupled to a plurality of devices provided in the first area via a plurality of first interrupt signal lines and a first interface; and
a deserializer provided in a second area, structured to receive serial data from the serializer, and coupled to a controller provided in the second area via a second interrupt signal line and a second interface,
wherein the plurality of devices are each structured to transmit a first interrupt request to the serializer via a corresponding one of the plurality of first interrupt signal lines,
wherein, in response to receiving the first interrupt request, without any request from the deserializer, the serializer is structured to identify an error device that has transmitted the first interrupt request from among the plurality of devices, to transmit an identification number of the error device to the deserializer, to read status information from the error device via the first interface, and to transmit the status information of the error device to the deserializer,
wherein the deserializer is structured to receive the identification number of the error device and the status information from the serializer and to store the identification number of the error device and the status information in an internal register,
wherein the deserializer is structured to transmit a second interrupt request to the controller via the second interrupt signal line, and to transmit the identification number and the status information of the error device in response to a read command from the controller,
and wherein the controller is structured to transmit the read command to the deserializer in response to receiving the second interrupt request from the deserializer.

2. The transmission system according to claim 1, wherein the serializer is coupled to a main device which is one from among the plurality of devices via a third interface,
wherein the deserializer is coupled to the controller via a fourth interface,
wherein the serializer receives main data generated by the main device via the third interface, and transmits the main data to the deserializer,
and wherein the deserializer transmits the main data received from the serializer to the controller via the fourth interface.

3. The transmission system according to claim 2, wherein the main device is a camera,
and wherein the main data includes image data.

4. A signal processing system provided with the transmission system according to claim 1.

5. An automobile provided with the signal processing system according to claim 4.

6. A signal processing system comprising:
a plurality of devices provided in a first area;
a serializer provided in the first area;
a plurality of first interrupt signal lines structured to couple the plurality of devices and the serializer;
a first interface structured to couple the plurality of devices and the serializer;
a deserializer provided in a second area, and structured to receive serial data from the serializer;
a controller provided in the second area;
a second interrupt signal line structured to couple the deserializer and the controller; and
a second interface structured to couple the deserializer and the controller,
wherein the plurality of devices are each structured to transmit a first interrupt request to the serializer via a corresponding one from among the plurality of first interrupt signal lines when an abnormality occurs,
wherein, in response to receiving the first interrupt request, without any request from the deserializer, the serializer is structured to identify an error device which is one device that has transmitted the first interrupt request from among the plurality of devices, to transmit an identification number of the error device to the deserializer, to read status information from the error device, and to transmit the status information of the error device to the deserializer,
wherein the deserializer is structured to receive the identification number of the error device and the status information, to store the identification number of the error device and the status information in an internal register thereof, and to transmit a second interrupt request to the controller via the second interrupt signal line in response to receiving the identification number of the error device,
and wherein, upon receiving the second interrupt request from the deserializer, the controller is structured to read the identification number of the error device and the status information from the internal register of the deserializer via the second interface.

7. A serializer structured to transmit serial data to a deserializer, the serializer comprising:
a serial interface circuit structured to communicate with a plurality of devices;
a plurality of interrupt pins structured to receive interrupt requests from the plurality of devices, wherein the plurality of devices are each structured to transmit a first interrupt request to the serializer via a corresponding one from among the plurality of first interrupt signal lines;
a transmitter structured to transmit data to the serializer; and
a logic circuit structured to monitor the plurality of interrupt pins, and such that, upon detecting the first interrupt request from an error device which is one from among the plurality of devices, without any request from the deserializer, the logic circuit is structured to transmit an identification number of the error device to the serializer via the transmitter, to access the error device via the serial interface circuit so as to read status information, and to transmit the status information to the deserializer via the transmitter.

8. A deserializer structured to receive serial data from a serializer, comprising:
a serial interface circuit structured to communicate with a controller;
an error output pin coupled to the controller via an interrupt signal line; and
a receiver structured to receive an identification number of an error device and status information from the serializer,
wherein, upon receiving the identification number of the error device from the serializer, without any request from the controller, the serial interface circuit transmits a second interrupt request to the controller via the error output pin,
wherein the controller is structured to transmit a read command to the deserializer in response to receiving the second interrupt request from the deserializer, and wherein, upon receiving the read command from the controller, the serial interface circuit transmits the identification number and the status information of the error device to the controller.

\* \* \* \* \*